No. 896,225. PATENTED AUG. 18, 1908.
C. F. MEHL.
MEANS FOR AUTOMATICALLY RESTORING A TROLLEY WHEEL TO THE WIRE.
APPLICATION FILED SEPT. 18, 1907.
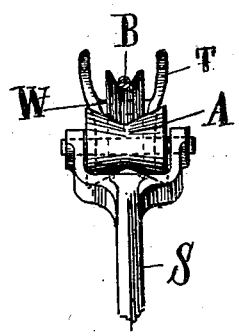
Fig. 2.
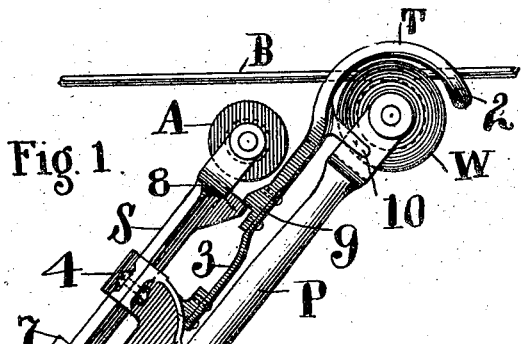
Fig. 1.
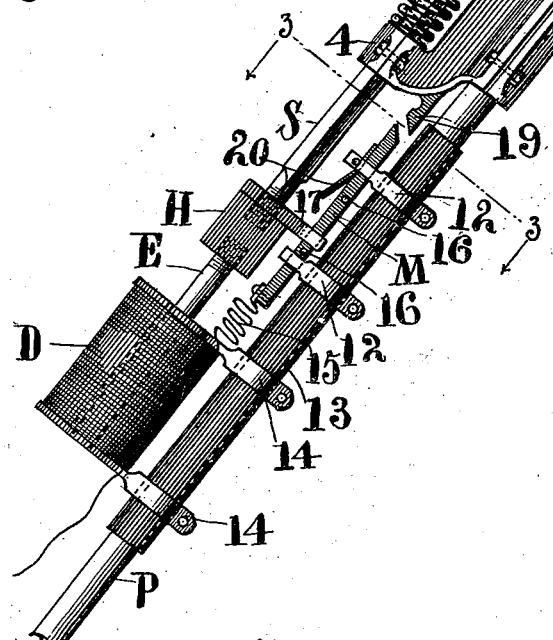
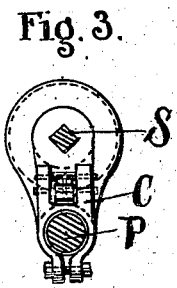
Fig. 3.
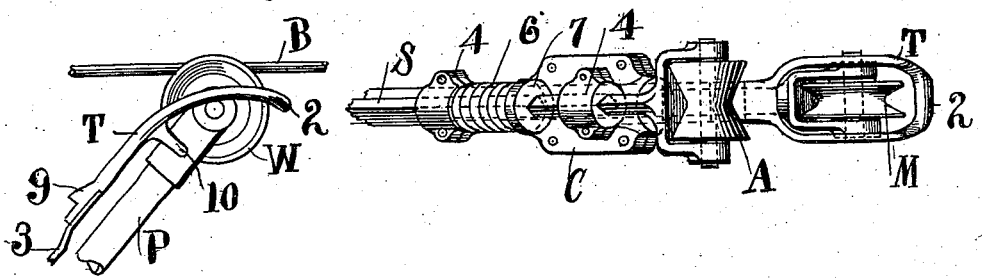
Fig. 5.    Fig. 4.
ATTEST
E. M. Fisher
F. C. Mussun
INVENTOR
Charles F. Mehl
By Fisher & Moser ATTYS.

UNITED STATES PATENT OFFICE.

CHARLES F. MEHL, OF CLEVELAND, OHIO.

MEANS FOR AUTOMATICALLY RESTORING A TROLLEY-WHEEL TO THE WIRE.

No. 896,225.  Specification of Letters Patent.  Patented Aug. 18, 1908.

Application filed September 18, 1907. Serial No. 393,430.

*To all whom it may concern:*

Be it known that I, CHARLES F. MEHL, a citizen of the United States, residing at Cleveland, in the county of Cuyahoga and State of Ohio, have invented certain new and useful Improvements in Means for Automatically Restoring a Trolley-Wheel to the Wire, and do declare that the following is a full, clear, and exact description of the invention, which will enable others skilled in the art to which it appertains to make and use the same.

My invention consists in means for automatically restoring a trolley wheel to the wire, all substantially as shown and described and particularly pointed out in the claims.

In the accompanying drawings, Figure 1 is a side elevation of a trolley pole and wheel, a section of a line wire, and my novel automatic trolley restoring devices mounted on said pole. Fig. 2 is a front elevation of the upper part of the pole and devices seen in Fig. 1, looking in from the left, and disclosing the relation of the parts when the regular wheel is on the wire. Fig. 3 is a cross section on line 3—3, Fig. 1. Fig. 4 is a plan view of the upper portion of the parts shown in Fig. 1, and Fig. 5 is a modification particularly of the trip member shown in Fig. 1.

P represents the trolley pole, which presumably is of any ordinary kind, and W the trolley wheel.

T is a tripping member or part for auxiliary wheel A, and the idea of this portion of the invention is that when the trolley wheel, for any reason, rides or runs off wire B, the said tripping member will be depressed by the wire engaging loop 2 thereon at its rear and thus depress said member T and liberate the auxiliary wheel so that it may promptly take the wire itself and thus continue electrical contact to the motor and not cause the car to stop as ordinarily occurs when the trolley leaves the wire. To these ends tripping member T has a spring shank 3 rigidly fixed to clamp support C that carries spindle or stem S of auxiliary wheel A, and said support C is clamped upon pole P and has bearings 4 on its outer or upper portion in which spindle S is slidable. Said stem or spindle is angular in cross section so as to hold auxiliary wheel A in right working relations in respect to all the parts and is surrounded by a comparatively strong spiral spring 6 mounted thereon between one of said bearings 4 and collar 7 on said spindle and adapted to lift the auxiliary wheel into action upon wire B the instant that tripping member T is depressed and unlocked from spindle S. Catches 8 and 9 respectively on spindle S and the shank of tripping member T normally engage and hold auxiliary wheel A in retired position, as in Fig. 1, but obviously, when said trip member is depressed by striking wire B these catches are released and auxiliary wheel A is at once thrown out and up into action under its power spring 6. Guide fingers 10 on the tripping member T serve to hold said member in right position laterally with respect to the trolley wheel and its immediate support.

It will be observed that auxiliary wheel A is of double conoidal shape, tapering from both ends to its depressed middle portion, and is of such length that it will strike the trolley wire when the trolley wheel runs off and hold a temporary running position thereon, spring 6 being heavy enough to maintain this engagement as against the upward spring pressure on regular wheel W. But this is intended to be only momentary or for a very brief period, because when the parts have been tripped and are working in this auxiliary way, an electrical circuit is established through the parts back to solenoid or magnet D which will withdraw the auxiliary wheel from action and at the same time automatically restore wheel W to action, the downward pull upon wheel A permitting wheel W to be raised at the same time and in like degree by the normal upward spring pressure upon the trolley pole. To these ends the solenoid has a core armature E connected through insulating head H with auxiliary wheel spindle S. A slidable contact member M is supported in suitable bearings 12 clamped onto insulating sleeve 13 on trolley pole P, and the solenoid or magnet D is supported on said sleeve by carrying clamps 14 in like manner, and the said contact member has wire connection 15 at one end with the solenoid and is provided with stop pins 16 on its side adapted to be engaged by a finger or fingers 17 on insulating head H. A conducting projection 19 on clamp support C is adapted to be engaged by sliding contact member M and confining spring 20 on said member M is adapted to slide within the upper bearing 12 thereof and help to maintain contact till member M is forcibly withdrawn.

When spring 6 throws the auxiliary wheel into action on wire B all the parts connected with spindle S are thrown up in like manner, and this causes finger 17 to move contact member M forward in touch with point 19, thus closing the electrical circuit from wire B down to the solenoid, and the solenoid being energized withdraws the auxiliary wheel from the wire and restores the various parts connected therewith to normal position while wheel W is thrown up into action and normal working conditions are reëstablished all around. All this is done automatically.

The modification Fig. 5 shows trip member T as normally down on a plane beneath the working level of wheel W, so that in no case can said part T strike an ordinary overhead obstruction while down normally, and this is the only difference over Fig. 1.

What I claim is:—

1. The trolley wheel and pole, in combination with an auxiliary wheel and a spindle therefor slidably mounted on said pole, catches adapted to hold said wheel in retirement, a spring to lift said wheel into working position when released, and electrically actuated means to withdraw said auxiliary wheel and permit the trolley wheel to resume working position.

2. A trolley pole and wheel and means to automatically restore said wheel to working position when it has left a wire comprising an auxiliary wheel mounted on said pole, means to project said auxiliary wheel into working position, electrical device to withdraw said wheel and means to lock said wheel in withdrawn position, said auxiliary wheel being mounted in advance of said trolley wheel and a tripping device to release said auxiliary wheel and free it for service.

3. Means to restore a trolley wheel to its wire comprising a trolley pole, an auxiliary wheel having a spindle slidably mounted on said pole, a trip member mounted on said pole and operatively engaging said spindle, a spring to project said auxiliary wheel into working position, and an electrically energized part adapted to withdraw said auxiliary wheel from working position, said trip member having a spring shank.

4. A trolley wheel and a pole therefor, an auxiliary wheel having a stem slidably mounted on said pole in front of said trolley wheel, and a spring to throw said auxiliary wheel up into service, means to hold said auxiliary wheel back comprising a tripping member having a spring shank and extending to the front of said trolley wheel across the path thereof below the plane of the line wire, and catches on said shank and the stem of said auxiliary wheel respectively, whereby when the trolley wheel leaves the wire said tripping member will strike the wire and work the release of said catches and liberate the auxiliary wheel.

In testimony whereof I sign this specification in the presence of two witnesses.

CHARLES F. MEHL.

Witnesses:
R. B. MOSER,
F. C. MUSSUN.